(12) United States Patent
Hawkins et al.

(10) Patent No.: US 6,442,637 B1
(45) Date of Patent: Aug. 27, 2002

(54) EXPANDABLE MOBILE COMPUTER SYSTEM

(75) Inventors: Jeffrey C. Hawkins, Redwood City; Peter Skillman, San Carlos; Michael Wise, Los Altos Hills; John Raff, Menlo Park; Daniel Sung-Hwe Kim, Palo Alto; Dennis Boyle, Palo Alto; Charles R. Lewis, Jr., Palo Alto, all of CA (US)

(73) Assignee: Handspring, Inc., Mountain View, CA (US)

( * ) Notice: Subject to any disclaimer, the term of this patent is extended or adjusted under 35 U.S.C. 154(b) by 0 days.

(21) Appl. No.: 09/374,058

(22) Filed: Aug. 12, 1999

(51) Int. Cl.[7] .............................. G06F 13/00; H05K 5/00
(52) U.S. Cl. ...................................... 710/300; 361/686
(58) Field of Search .............................. 710/1, 300, 62, 710/72; 361/686, 726, 740, 683; 439/372, 153; 403/327, 325; 307/66

(56) References Cited

U.S. PATENT DOCUMENTS

| | | | |
|---|---|---|---|
| 5,574,859 A | * | 11/1996 | Yeh |
| 5,689,654 A | | 11/1997 | Kikinis et al. |
| 5,710,728 A | | 1/1998 | Danielson et al. |
| 5,712,763 A | | 1/1998 | Bullister |
| 5,818,691 A | | 10/1998 | McMahan et al. |
| 5,864,708 A | * | 1/1999 | Croft et al. |
| 5,941,965 A | * | 8/1999 | Moroz et al. |
| 6,091,602 A | * | 7/2000 | Helot |
| 6,161,157 A | * | 12/2000 | Tripathi et al. |

FOREIGN PATENT DOCUMENTS

WO    WO 96/03707    2/1996

OTHER PUBLICATIONS

Nintendo of America (1996) Compact Video Game System.
PCMCIA Standards (1992) Personal Computer Memory Card International Association.

* cited by examiner

*Primary Examiner*—Gopal C. Ray
(74) *Attorney, Agent, or Firm*—Deg Johansen; Stattle, Johansen & Adeli LLP

(57) ABSTRACT

An expandable mobile computer system is described. The mobile computer system includes a peripheral expansion interface that allows a large number of different sized expansion peripherals to be created and used with the mobile computer system. A pair of rails forms a first opening of the peripheral expansion interface wherein an expansion peripheral device may be inserted. Large expansion peripherals may extend in a first dimension out of that first opening. The rails also form a second opening along a second dimension orthogonal to the first dimension. Large expansion peripherals may also extend outward from the peripheral expansion interface in the second dimension.

31 Claims, 12 Drawing Sheets

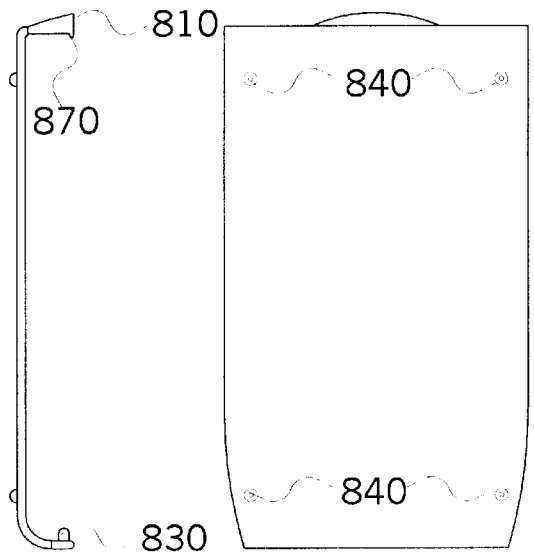
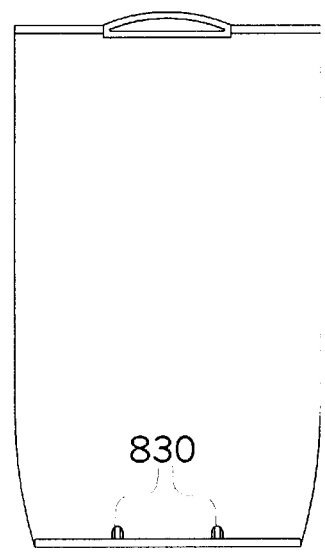
Figure 8A  Figure 8B  Figure 8C
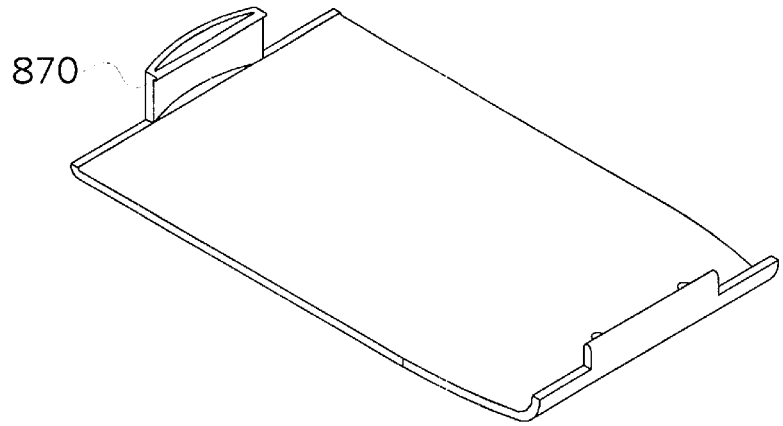
Figure 8D
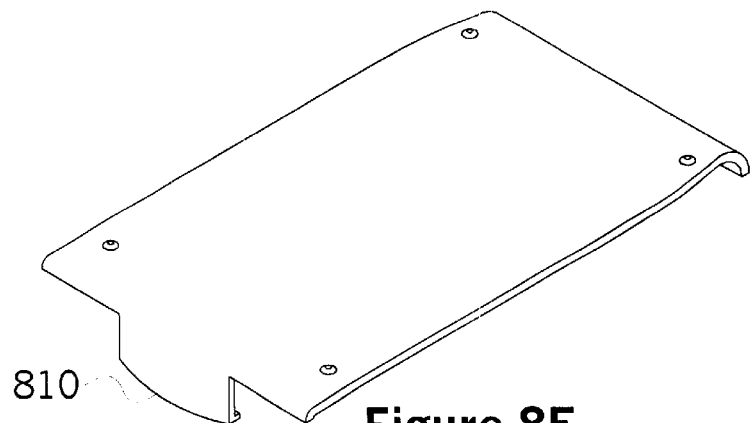
Figure 8E

EXPANDABLE MOBILE COMPUTER SYSTEM

FIELD OF THE INVENTION

The present invention relates to the field of portable computer systems. In particular the present invention discloses a portable computer system that can easily be expanded to handle many new add-on peripherals.

BACKGROUND OF THE INVENTION

Handheld computer systems have become a very popular form of computing device. Handheld computer systems allow users to access large amounts of personal information such as an address book, a personal calendar, and a list of to-dos. In particular, the Palm® series of palm-sized computer systems from Palm Computing, Inc of Santa Clara, Calif. (a division of 3Com Corporation) have become the de facto standard of handheld computer systems.

However, users have been demanding additional functionality from handheld computer systems. For example, Casio has introduced a Windows CE based palm-sized personal computer that performs voice recording. Although different models of mobile computer systems can be introduced that add additional features, it is desirable to include a hardware interface on a handheld computer system. The hardware interface n a handheld computer system that new peripheral devices to be added to the existing handheld computer system.

The Palm® series of palm-sized computer systems includes an external serial interface for communicating with external peripherals. However, an external serial interface is limited due to the limited communication bandwidth and limited interface features. It would therefore be desirable to provide another system for allowing peripheral devices to couple to a mobile computer system. Ideally, the external interface should allow many different types of peripheral devices to be used.

SUMMARY OF THE INVENTION

An expandable handheld computer system is disclosed. The handheld computer system includes a peripheral expansion interface that allows a large number of different sized expansion peripherals to be created. The peripheral expansion interface is formed with a pair of rails that form a first opening wherein a peripheral device may be inserted. Expansion peripherals may extend in a first dimension out of said opening. The rails also form a second opening along a second direction orthogonal to said first dimension. Expansion peripherals may also extend outward in the second dimension.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art in view of the following detailed description in which:

FIGS. 8A through 8E illustrate a protective cover for the mobile computer system.

DETAILED DESCRIPTION OF THE PREFERRED EMBODIMENT

A method and apparatus for constructing a portable computer system that can easily be expanded to handle many new add-on peripherals is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the Universal Serial Bus (USB). However, the same techniques can easily be applied to other types of data communication standards such as IEEE 1394 "FireWire".

Portable Computer System Overview

Figure 1A:
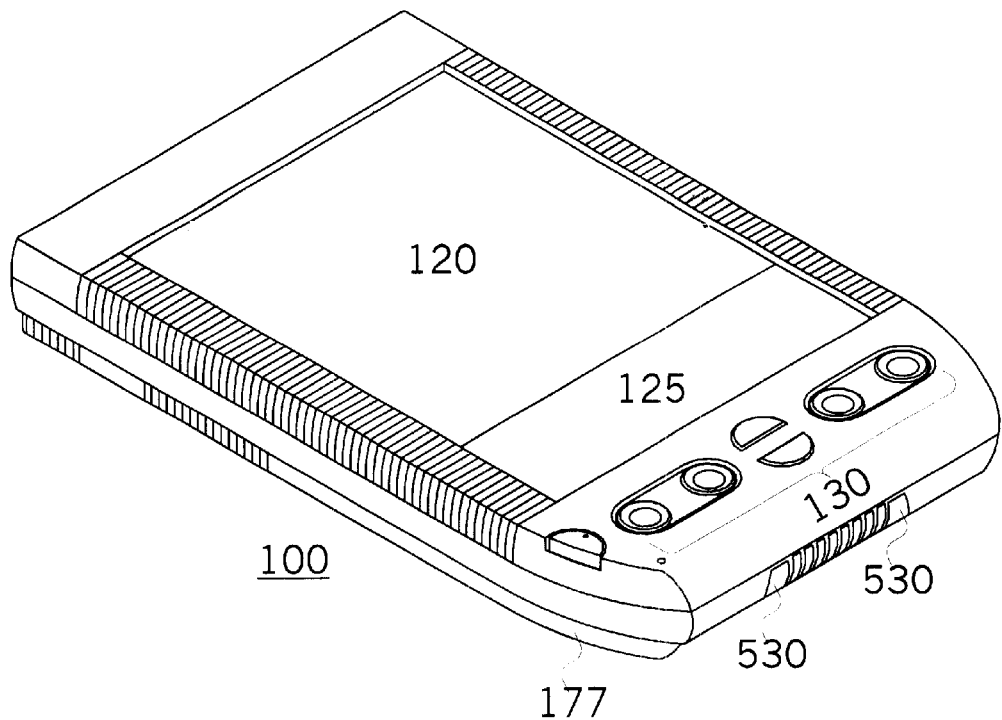
FIGS. 1A and 1B illustrate the front and back of a mobile computer system with an open external peripheral interface.
Figure 1B:
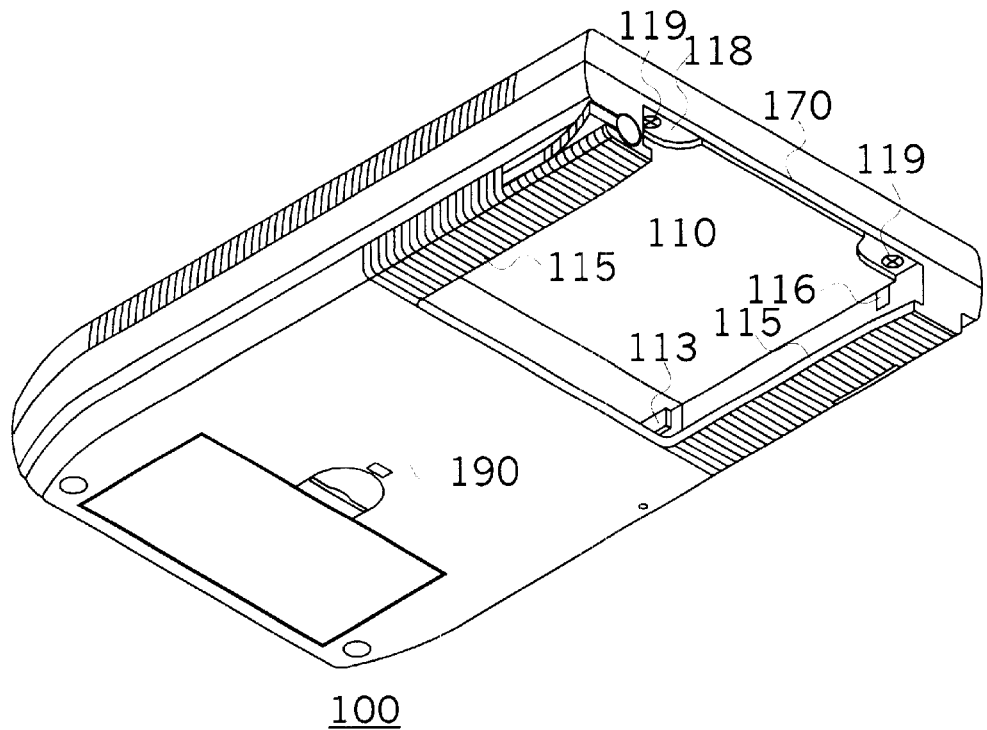

FIGS. 1A and 1B illustrate a mobile computer system 100. As illustrated in FIG. 1A, the mobile computer system includes a display area 120 for displaying information. The display area 120 and additional area 125 are covered with a digitizer pad for entering information using a stylus. The mobile computer system 100 also includes a set external buttons 130 that are also used to enter user input.

Expansion Slot

The mobile computer system 100 includes an expansion interface on the top portion of the back of mobile computer system 100. FIG. 1B illustrates the mobile computer system 100 with the expansion interface 110 open.

In one embodiment, the expansion interface 110 allows peripheral devices to be inserted and coupled directly to a data bus of the mobile computer system 100. Furthermore, in one embodiment, an interrupt line from the processor in the mobile computer system 100 is coupled to the expansion interface 110 such that the processor can detect when a peripheral device is inserted or removed. A second interrupt line may be provided to the expansion interface 110 such that a peripheral may obtain the attention of the processor.

As illustrated in FIG. 1B, the expansion interface allows a peripheral device to be slid into an opening on the top of the mobile computer system 100. The expansion interface 110 is formed by two substantially parallel rails 115 that snugly hold the inserted peripheral device. The two parallel rails 115 form an opening on the top of the mobile computer system 100. The rails may not be perfectly parallel since the rails may be slightly farther apart near the opening to allow peripheral devices to be easily inserted.

In one embodiment, a "slide" is inserted laterally into the mold used to create the back shell of the mobile computer system in order to create the two substantially parallel retaining rails 115 that hold peripheral devices. Since the slide is inserted laterally, a counter-sunk hole cannot be created for screws 119. Instead, a pair of recessed shelves 118 are formed by the slide that forms the expansion interface 110. The recessed shelves 118 cause the heads of screws 119 to be flush with the rear wall of the expansion interface 110.

Along the two side walls of the expansion interface 110 are two detents. FIG. 1B illustrates only one detent 116, however another detent (not shown) exists on the other side wall in a symmetrical position. Expansion peripherals may use the detents to secure themselves into the expansion interface 110.

A "Dummy" Peripheral

Figure 1C:
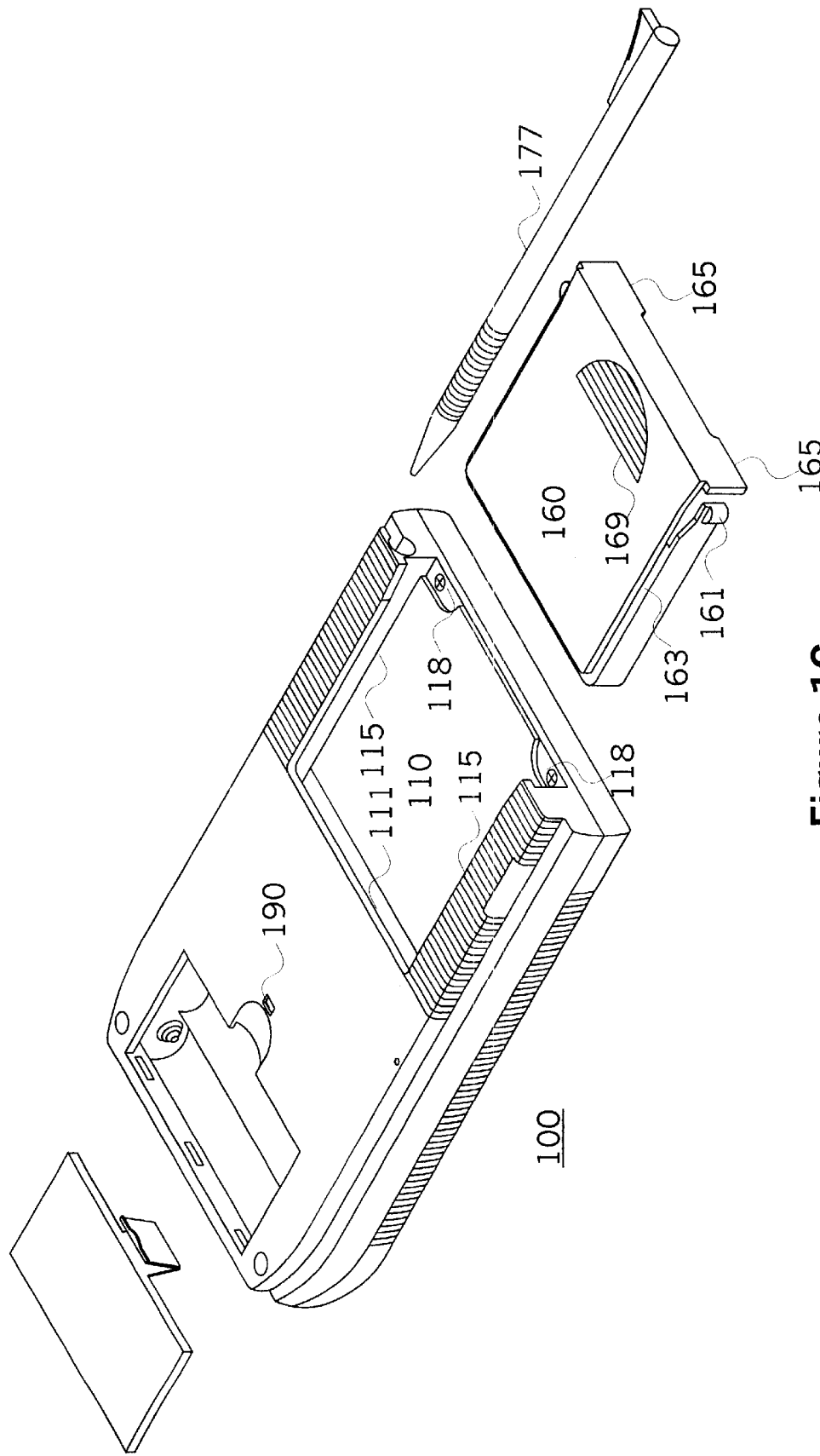
FIG. 1C illustrates the mobile computer system of FIGS. 1A and 1B with a "dummy" peripheral being inserted into the external peripheral interface.

FIG. 1C illustrates the mobile computer system 100 with a small "dummy" peripheral 160 being inserted into expansion interface. The dummy peripheral 160 protects the electrical interface of the expansion interface when no real peripheral device is being used.

The dummy peripheral 160 features ledges 163 that slide along the two parallel retaining rails 115 of the expansion interface 110. The dummy peripheral 160 includes a couple of flexible curved teeth 161 that engage the detents (116 of FIG. 1B) on the side walls of the expansion interface 110. The flexible curved teeth 161 hold the dummy peripheral in place. However, sufficient upward pressure will cause the flexible curved teeth 161 to bend inward and allow the dummy peripheral 160 to be removed from the expansion interface 110. A ribbed surface 169 provides friction for a users finger to remove the dummy peripheral 160 from the expansion interface 110.

Figure 1D:
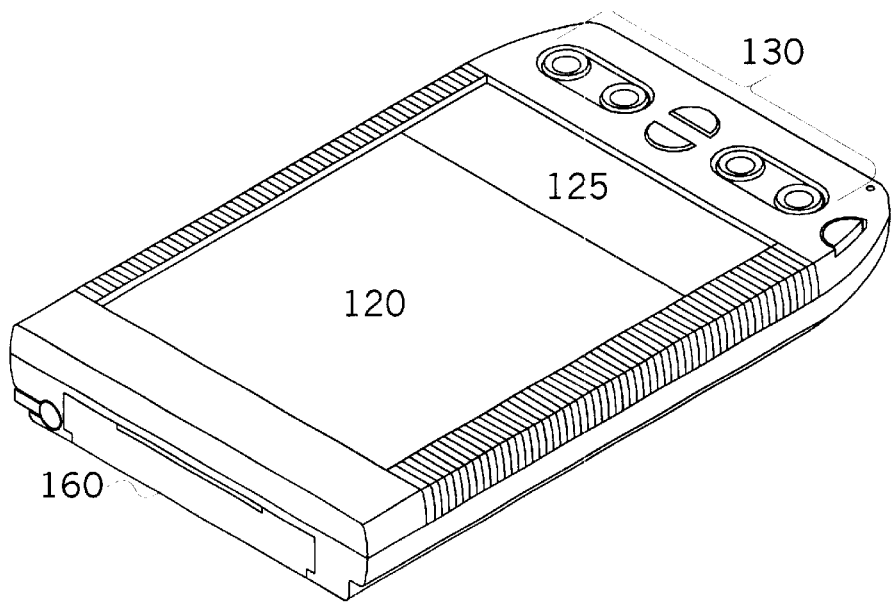
FIGS. 1D and 1E illustrate the mobile computer system of FIGS. 1A and 1B with the dummy peripheral housed within the external peripheral interface.
Figure 1E:
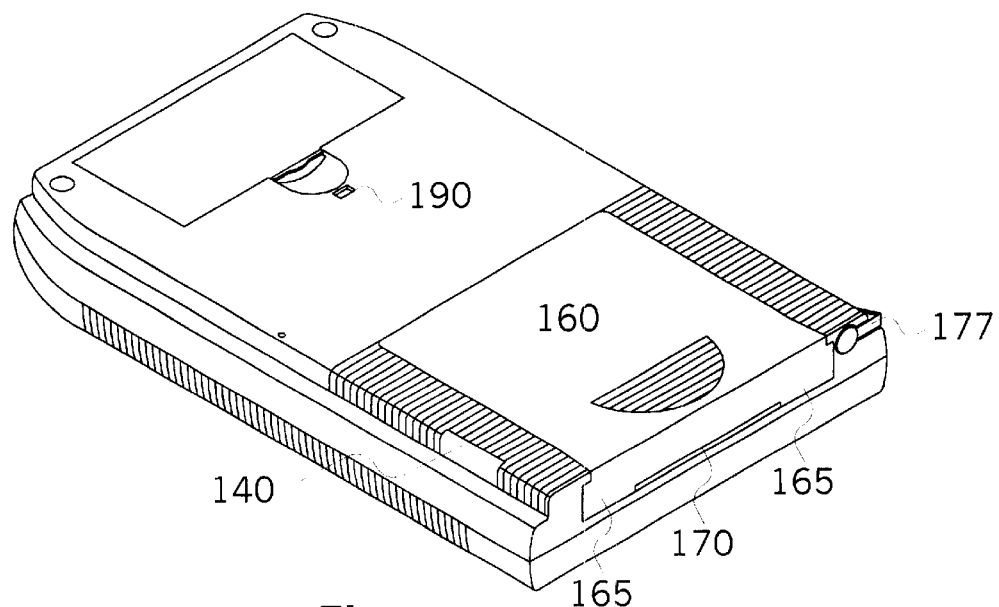
Figure 2:
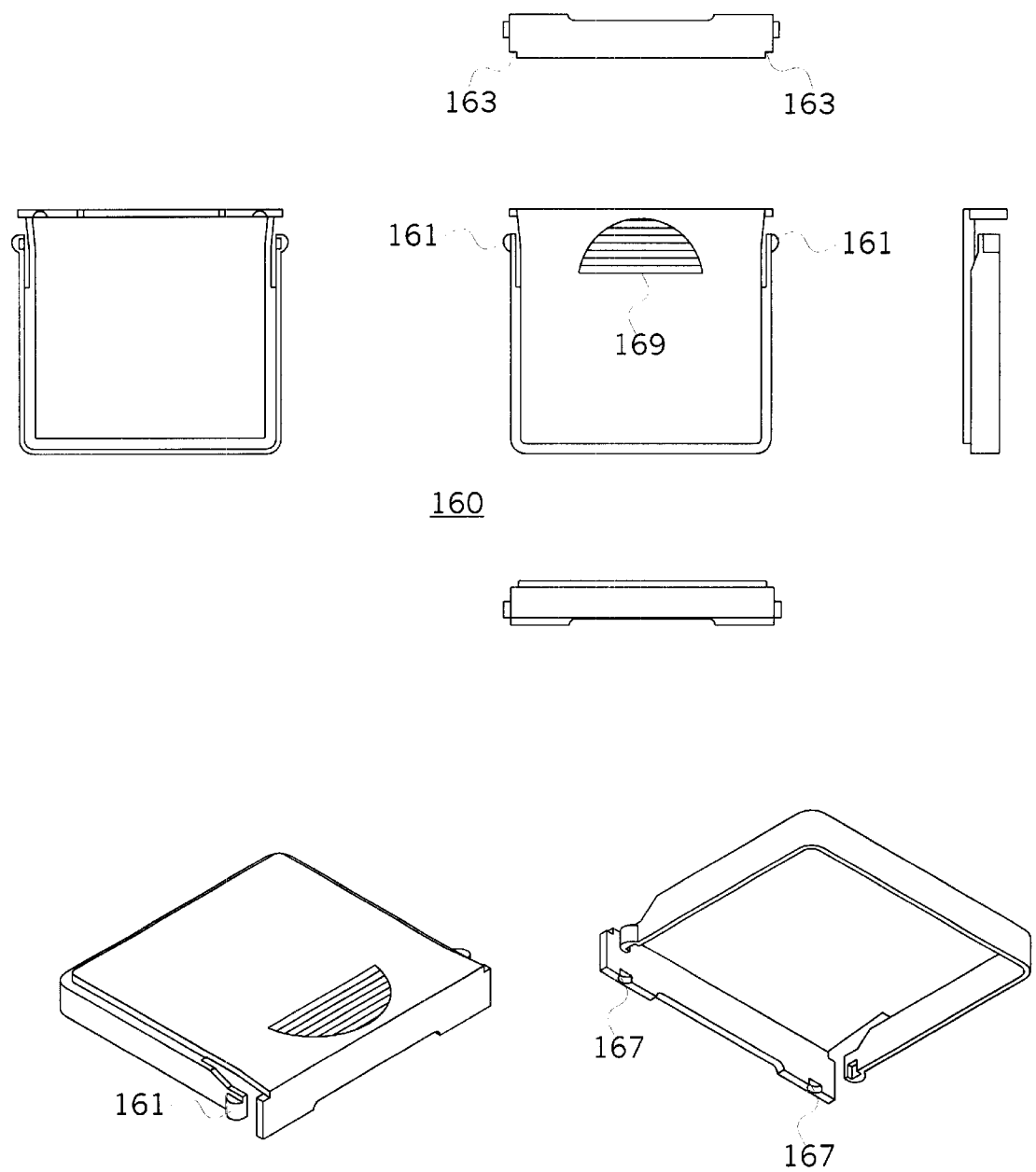
FIG. 2 illustrates several views of the dummy peripheral.

As previously set forth, the opening of the expansion interface 110 has recessed shelves 118 in order to have retaining screws flush with the back surface of the expansion interface 110. To render an aesthetically pleasing design, a pair of tabs 165 extend downward from the dummy peripheral 160 to fill the gap created by the recessed shelves 118. FIGS. 1D and 1E illustrate the mobile computer system 100 when the expansion interface contains the dummy peripheral 160. As illustrated in FIGS. 1D and 1E, the tabs 165 fill the recessed shelves such that no unsightly gap is created along the top of the mobile computer system 100. FIG. 2 provides several views of one embodiment of the dummy peripheral 160.

Expansion Slot Expandability

Referring back to FIG. 1C, it can be shown that the expansion interface 110 allows peripheral devices to extend in all three dimensions. As illustrated in FIG. 1C, the expansion interface 110 is open on the back of the mobile computer system 100 except for the small retaining rails 115 on the sides of expansion interface 110 and the electrical contact area 111. Thus, a peripheral device designed for the expansion interface 110 can extend outward from the back of the mobile computer system 100 along a first dimension.

The insertion opening of the expansion interface 110 at the top of the mobile computer system 100 is also unconstrained. Thus, a peripheral device designed for expansion interface 110 can extend upward out of the insertion opening of the expansion interface 110 along a second dimension orthogonal to the first dimension.

Once a peripheral device has extended out of the expansion interface 110 along the first dimension out the back opening or along the second dimension out the insertion opening, the peripheral device can be extended laterally along a third dimension. (The third dimension is orthogonal to the first and second dimensions.)

With the expansion interface 110 of the present invention, a substantial amount of surface area of expansion peripherals is externally accessible. The surface area can be used to provide externally accessible interfaces such as displays, buttons, electrical interfaces, and battery compartment openings.

Expansion Peripherals

Figure 3:
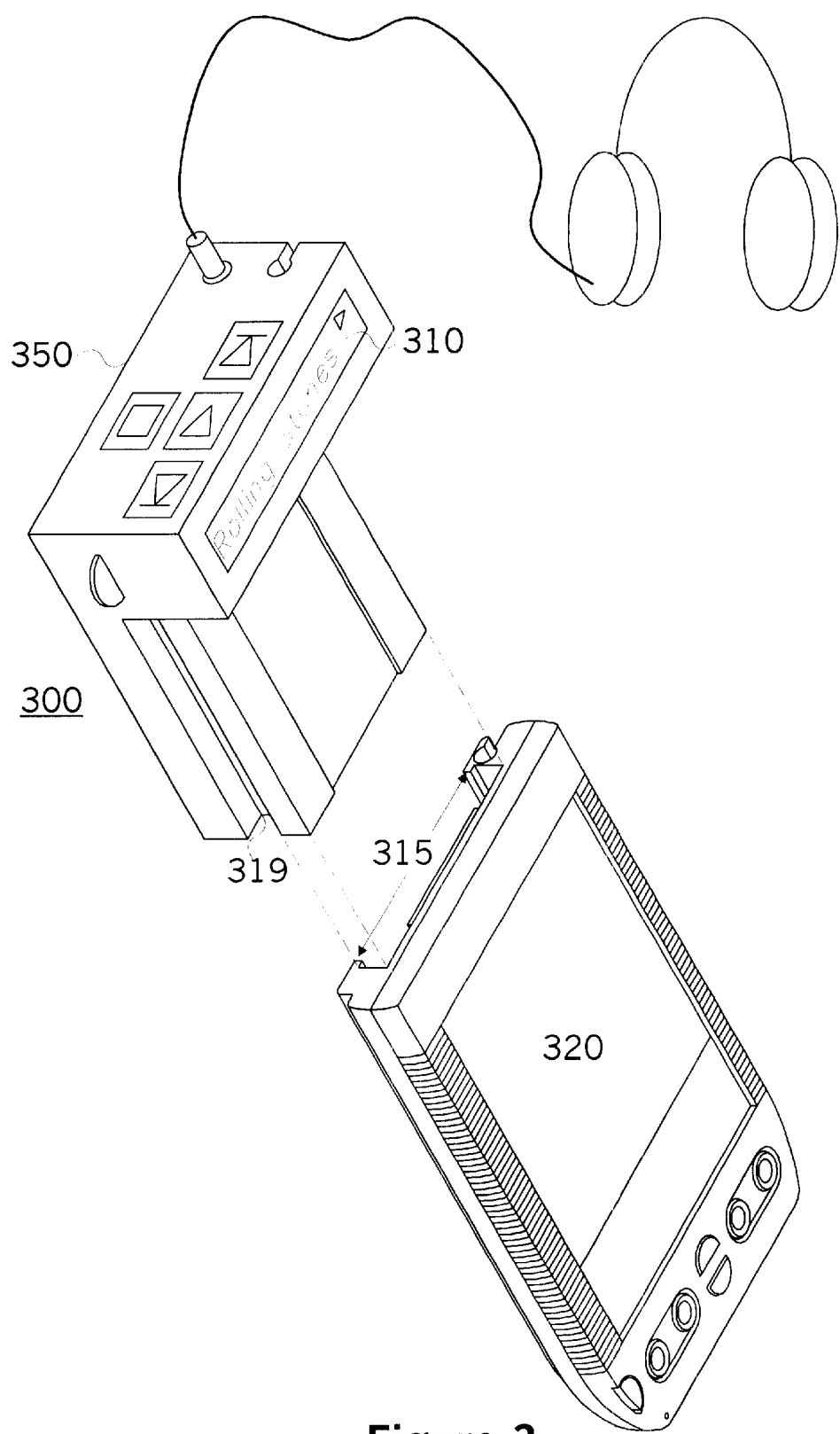
FIG. 3 illustrates a MP3 player peripheral device being inserted into the peripheral expansion interface of a mobile computer system.

FIG. 3 illustrates one embodiment of a peripheral device 300 that works within the expansion interface 110 of the mobile computer system 100 yet expands in all three dimensions. The example peripheral device 300 is an MP3 (MPEG2, Audio layer 3) digital audio player device.

Referring to FIG. 3, the MP3 peripheral device 300 extends out of the back opening of expansion interface for additional space. Furthermore, the MP3 peripheral device 300 extends out of the top opening of the expansion interface. Note that by extending out of the top, a portion of the peripheral device 300 is visible and accessible from the front of the mobile computer system. In this manner, a display 310 may be placed on the front of the device as illustrated in FIG. 3. The display 310 allows the user to see the display 310 when viewing the main display screen 320 of the mobile computer system. Other user interface elements such as buttons may be placed that front surface. In the embodiment of FIG. 3, a set of buttons have been placed on the top of the peripheral device 300.

Referring to FIG. 3, it can be seen that the peripheral device 300 can extend to the full width of the mobile computer system (or even wider) after the peripheral device 300 extends out the top or back of the expansion interface slot. A slot 19 may be formed when a peripheral device 300 extends out the back of the expansion interface slot. Slot 19 engages the retaining rails 315 of the expansion interface slot.

The back surface 350 of peripheral device 300 can be used to provide an opening for a battery compartment (not shown). In this manner, the peripheral device can supply its own power source. Due to the accessible back, batteries in the battery compartment may be replaced while the peripheral device is inserted within the expansion interface of the mobile computer.

Standard Expansion Peripheral Housing

Figure 4A:
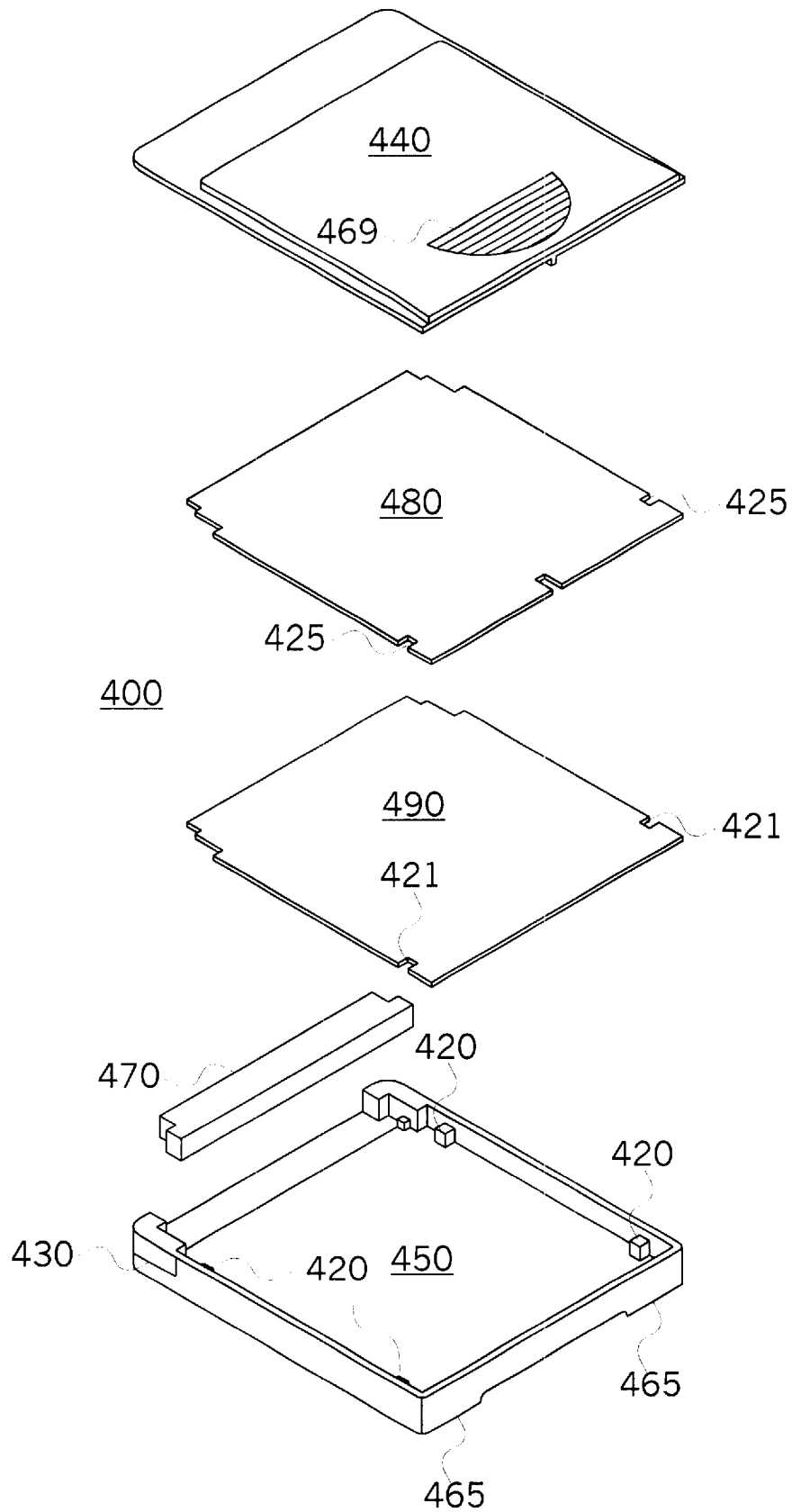
FIG. 4A illustrates the elements of a standard expansion peripheral device.

To simplify the design of small peripheral devices for the mobile computer system of FIGS. 1A and 1B, a standard expansion peripheral housing has been designed. FIG. 4A illustrates the standard expansion peripheral housing 400.

Referring to FIG. 4A, the outer casing of the standard expansion peripheral housing 400 consists of a lower case 450 and an upper case 440. The lower case is molded in a shape to accept a standard PC Card (formerly PCMCIA) female connector 470. By using a standard off-the-shelf PC Card connector, the costs are minimized. However, to prevent confusion with PC Card type peripherals, the lower case 450 uses different "keying shape" 430 such that a PC Card peripheral can not be inserted in the expansion interface. By preventing PC Card peripherals from being inserted into the expansion interface, the mobile computer system and the PC Card peripheral are protected from damage.

Figure 4D:
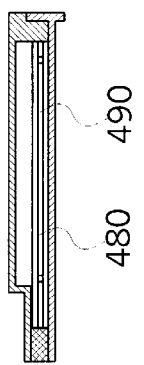
FIGS. 4B through 4G illustrate several views of the standard expansion peripheral device.
Figure 4C:

The standard expansion peripheral housing 400 usually uses only a single printed circuit (PC) board. In some cases, tall electrical components 491 will be used on one side of a PC board such that the PC board should be flush with the bottom of the lower case as illustrated in FIG. 4C. In such instances, only a lower PC board 490 is used. Lower PC board 490 has large cut-away slots 421 that completely avoid posts 420 in the lower case 450 such that the lower PC board 490 lies flush on the bottom of lower case 450. Note that the components 491 may extend up through the upper case 440 if necessary. For example, a hole may be placed in upper case 440 to allow access to an external connector mounted on lower PC board 490.

Figure 4B:

In other cases, thinner electrical components will be placed on both the top of the PC board (see component 481) and the bottom of the PC Board (see component 482) as illustrated in FIG. 4B. In such cases, only an upper PC board 480 is used. Upper PC board 480 has smaller cut-away slots 425 that sit on a ledge of posts 420 in the lower case 450 such that the upper PC board 480 is suspended in the center of the lower case 450. In this manner, electrical components can be placed onto both sides of upper PC board 480 as illustrated in FIG. 4B.

If necessary, it may be possible to use both an upper PC board 480 and lower PC board 490 in a single standard expansion peripheral housing 400. FIG. 4D illustrates a cut-away side view of the standard expansion peripheral housing 400 containing both an upper PC board 480 and lower PC board 490. Most peripheral devices will only use a single PC board.

Figure 4G:
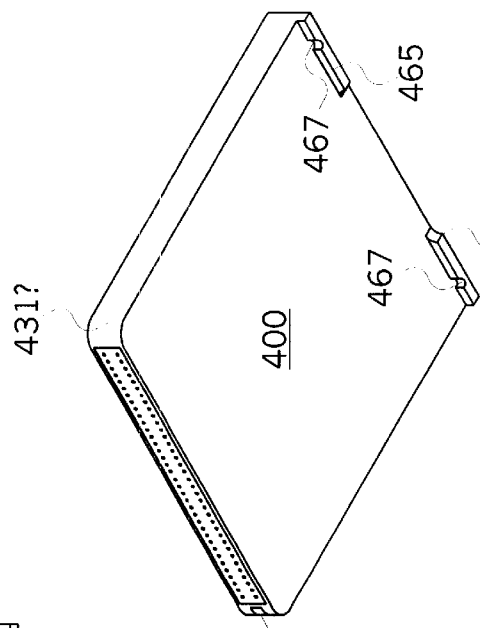
Figure 4F:
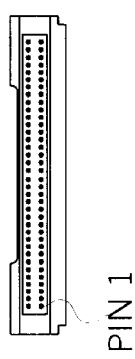
Figure 4E:
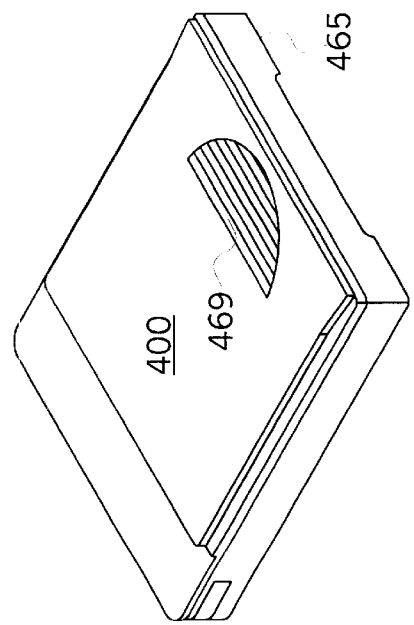

FIGS. 4E, 4F, 4G illustrate various external views of an assembled standard expansion peripheral housing 400. Note that the tabs 465 in FIG. 4G include recesses to accommodate the heads of screws

External Interface Port

In addition to the peripheral expansion interface, a portable computer system may include an external interface. The external interface can be used to communicate with other computer systems.

Figure 5A:
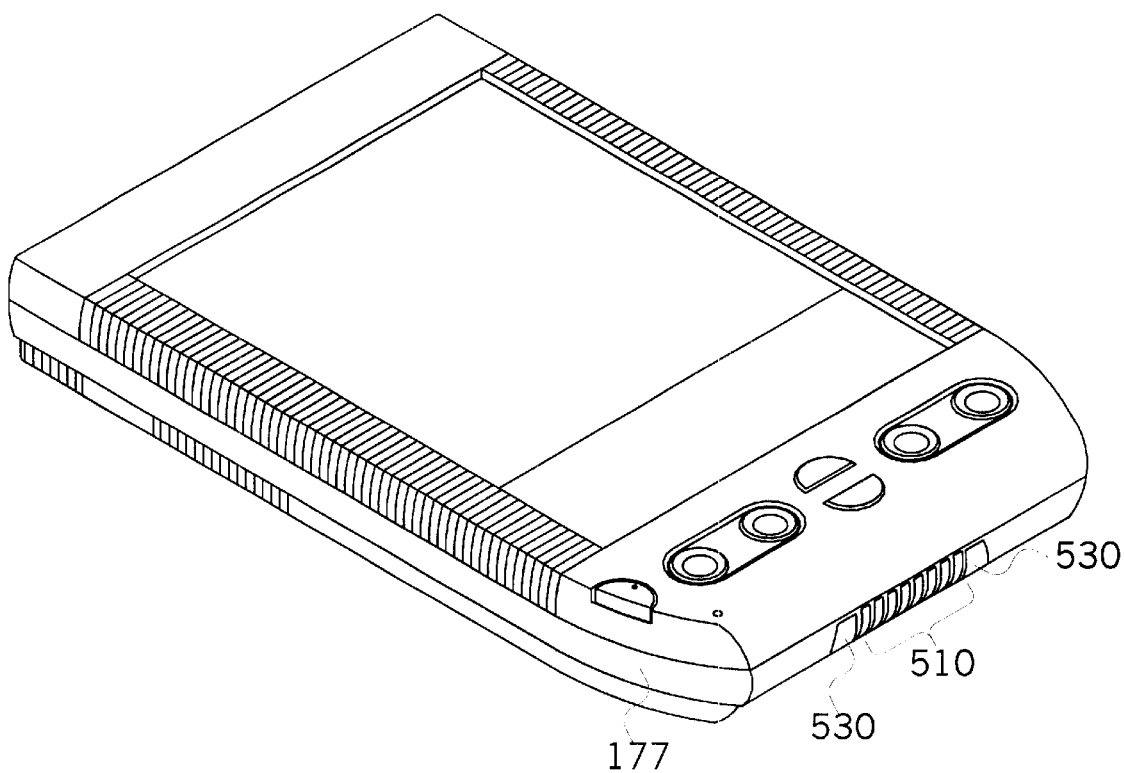
FIGS. 5A and 5B illustrate an external interface port on the mobile computer system.
Figure 5B:
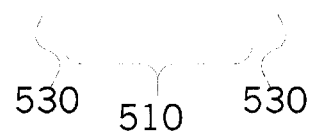

FIGS. 5A and 5B illustrate a view of a mobile computer system with an external interface 510. In the embodiment of FIGS. 5A and 5B, the external interface 510 comprises eight electrical contacts assigned as follows:

TABLE 1

| INTERFACE CONTACT | CONTACT FUNCTION |
|---|---|
| 1 | RXD: Serial Receive |
| 2 | Input select pin |
| 3 | Synchronize Interrupt |
| 4 | GND: Common Ground |
| 5 | USB: Data− |
| 6 | USB: Data+ |
| 7 | Peripheral Charge Power |
| 8 | TXD: Serial Transmit |

The external interface 510 includes the contacts necessary for coupling the mobile computer system to another computer system in two different manners: Universal Serial Bus and Serial Port. As illustrated in Table 1, the external interface 510 includes a set of Universal Serial Bus (USB) signals for communicating with a computer system that has a Universal Serial Bus port. Specifically, the external interface 510 has a USB Data+ signal, a USB Data− signal, and a common ground. (The USB VBus power signal may be used in other implementations, not shown.) The external interface 510 also includes a Serial Transmit, a Serial Receive, and a Common Ground for communicating with a computer system or peripheral through a standard serial port.

The external interface 510 includes a peripheral charge power contact. The peripheral charge power contact is electrically coupled to an electrical contact on the expansion interface. The peripheral charge power contact is used to provide power to peripheral devices placed within the expansion interface of mobile computer system. Referring back to FIG. 3, if the peripheral device 300 includes one or more rechargeable batteries, the rechargeable batteries may be recharged using current received through the peripheral charge power contact.

The eight electrical contacts of the external interface 510 are surrounded by a pair of alignment/receptors 530. The alignment/receptor holes 530 have two functions. First, the alignment/receptor holes 530 allow a connector that will communicate with external interface 510 to align itself with the external interface 510. Second, the alignment/receptor holes 530 can be used to attach various devices to the external interface 510.

Cradle for linking External Port on Mobile Computer System to PC

Figure 6A:
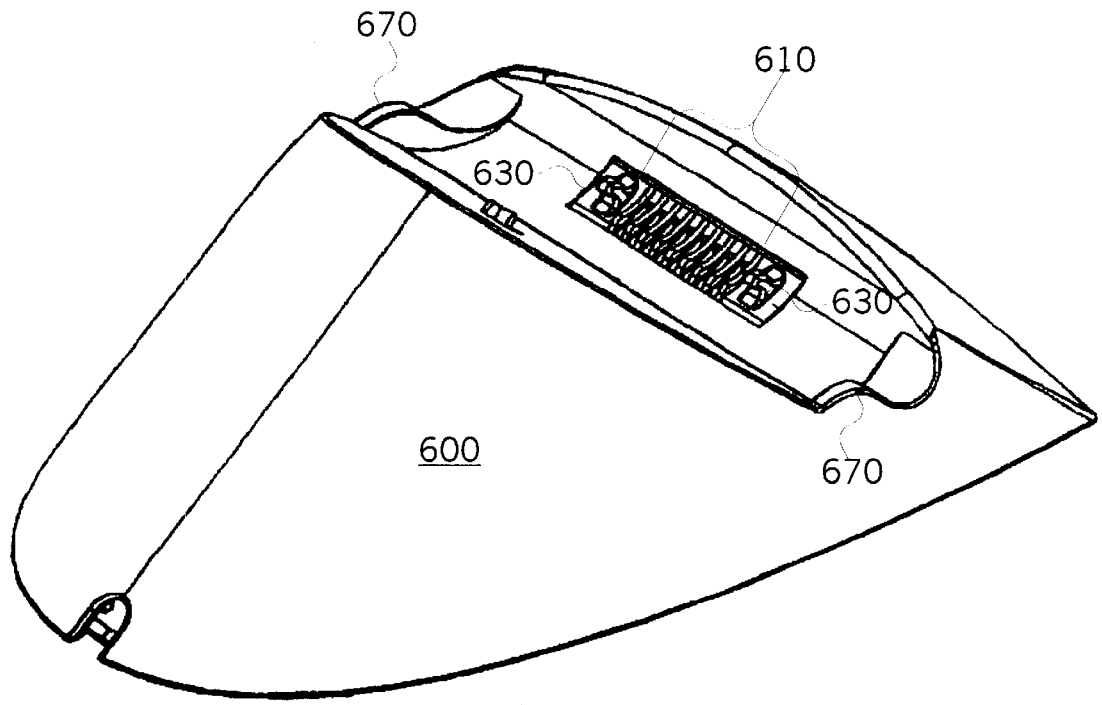
FIGS. 6A and 6B illustrate a cradle that interfaces with the external interface port on the mobile computer system.
Figure 6B:
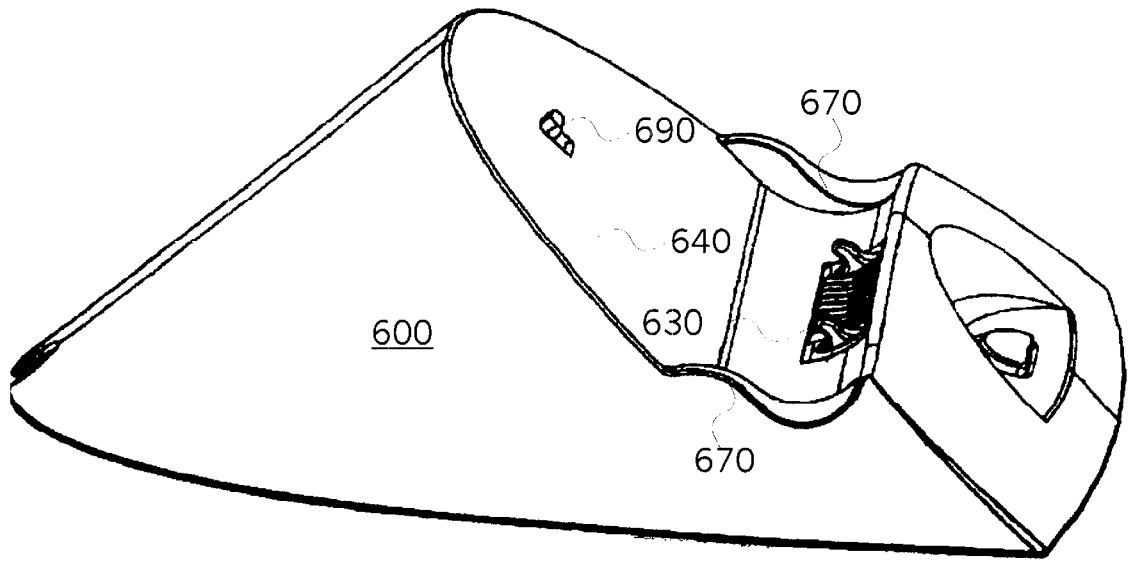

One desired use of the external interface 510 is to communicate with a personal computer system such that a user can share data on the mobile computer system with the personal computer system and data on the personal computer system with the mobile computer system. FIGS. 6A and 6B illustrate one possible example of a "cradle" 600 that electrically connects to the external interface 510 when the mobile computer system is placed into the cradle 600.

Referring to FIG. 6A, the cradle 600 features a pair of side walls 670 that "pre-align" the mobile computer system as it is being placed into the cradle 600. Specifically, the curved bottom portion 177 of the mobile computer system of FIG. 1A is guided by the cradle side walls 670. Thus, when the external interface 510 of the mobile computer system of FIG. 5A nears the electrical contacts 610 of the cradle 600, the cradle side walls 670 will have closely aligned the two sets of electrical contacts.

Figure 6C:
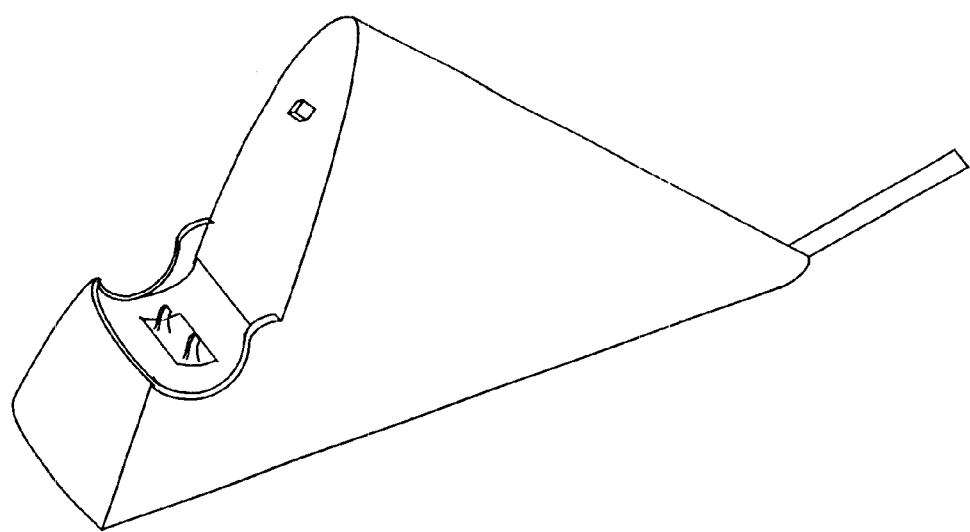
FIG. 6C illustrates a cradle having straight alignment pins.

A final alignment is performed by alignment pins 630 on the cradle 600. Alignment pins 630 engage the alignment/receptor holes 530 in the mobile computer system such that the external interface 510 will accurately align with the electrical contacts 610 of the cradle 600. Note that in the embodiment of FIGS. 6A and 6B, the alignment pins 630 on the cradle 600 are curved. The curved shape allows the mobile computer system to be initially inserted vertically and then rotated back until the mobile computer system rests on the back surface 640 of the cradle 600. In another embodiment illustrated in FIG. 6C, the alignment pins 630 are straight.

Figure 7:
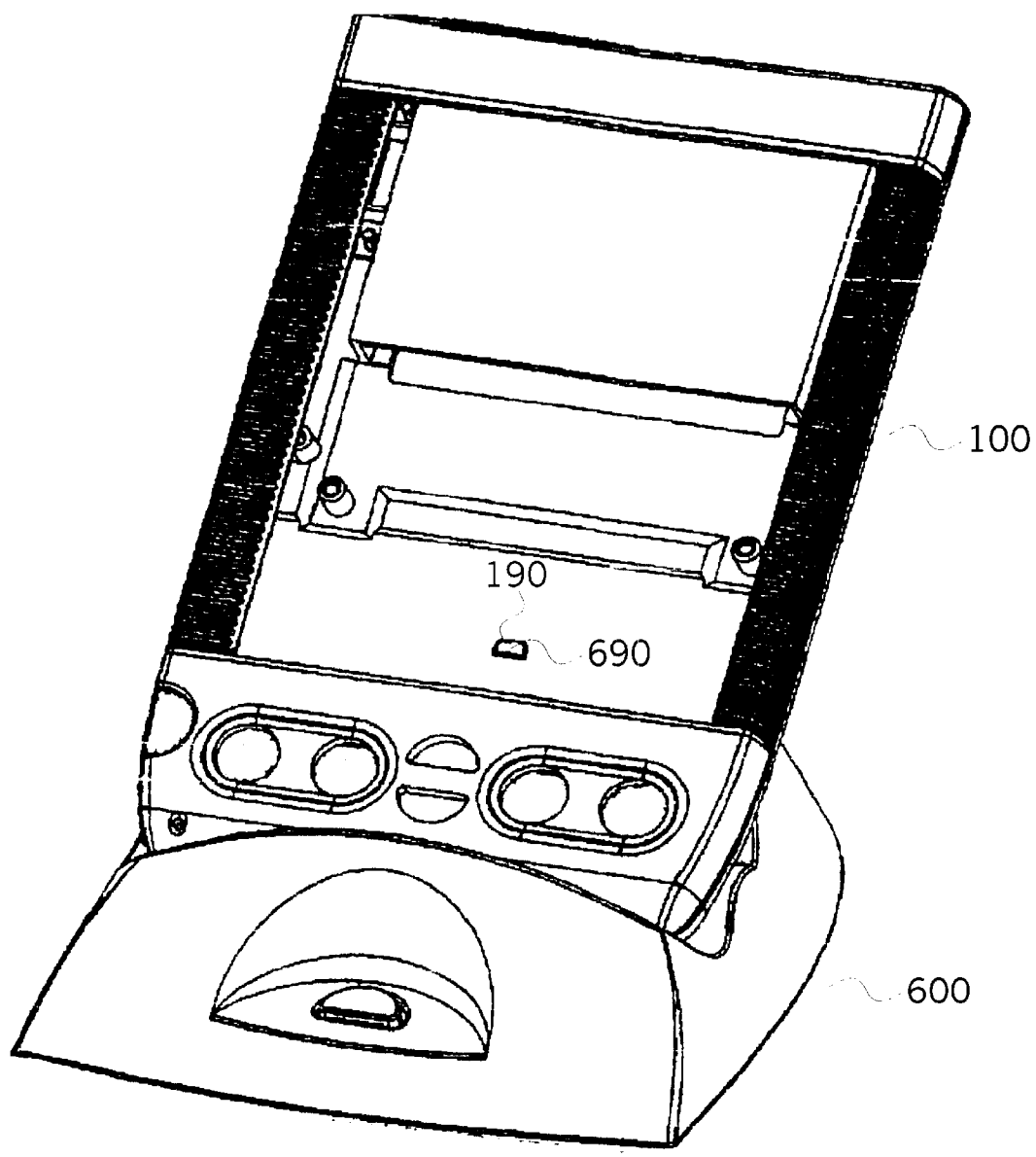
FIG. 7 illustrates a hollow mobile computer system placed into the cradle of FIGS. 6A and 6B.

To ensure communication between the mobile computer system and the cradle 600, there must be a good electrical contact between the electrical contacts of the external interface 510 on the mobile computer system of FIG. 5A and the electrical contacts 610 of the cradle 600. The cradle 600 of the present invention includes a retention pin 690 to ensure such good electrical contact. Specifically, retention pin 690 engages a hole 190 on the back of the mobile computer system 100 of FIG. 1B. FIG. 7 illustrates the shell of a mobile computer system 100 (internal parts have been removed for clarity) sitting within a cradle 600 such that the retention pin 690 has engaged the hole 190 on the back of the mobile computer system 100.

Protective Cover for Mobile Computer System

The alignment/receptor holes 530 of the mobile computer system in FIGS. 5A and 5B can be used other purposes. One use is to hold a protective cover. FIGS. 8A through 8E illustrate one embodiment of a protective cover that may be used with the mobile computer system. As illustrated in FIGS. 8A through 8E, the protective cover includes a pair of pins 830 that engage the alignment/receptor holes 530 at the bottom of the mobile computer system. At the top of the protective cover is a tab 870 that engages a small recess 170 on the top of the mobile computer system as illustrated in FIGS. 1B and 1E.

Since both the small recess 170 on the top of the mobile computer system and the alignment/receptor holes 530 at the bottom of the mobile computer system are substantially centered, the protective cover can be placed on both the front and back of the mobile computer system. When the protective cover is on the front of the mobile computer system, the display screen 120 and buttons 130 are protected. When the protective cover is on the back of the mobile computer system, the interface elements of the mobile computer system (the display screen 120 and buttons 130) are available for use. Furthermore, the protective cover includes small feet 840 that support the mobile computer system when it is placed on a flat surface. The protective cover includes a finger tab 810 that is used to remove the protective cover from the mobile computer system.

The foregoing has described a constructing a portable computer system that can easily be expanded to handle many new add-on peripherals is disclosed. It is contemplated that changes and modifications may be made by one of ordinary skill in the art, to the materials and arrangements of elements of the present invention without departing from the scope of the invention.

We claim:

1. A mobile computer system, said mobile computer system comprising:
   a processor;
   an expansion bus, said expansion bus coupled to said processor; and
   an expansion interface, said expansion interface comprising,
      an electrical interface to said expansion bus, and
      a pair of substantially parallel retaining rails, said pair of retaining rails spaced far apart along a first dimension such that said retaining rails substantially occupying a width of said mobile computer system along said first dimension, said pair of parallel retaining rails forming a first opening for insertion of a peripheral device along a second dimension, and said pair of parallel retaining rails forming a second opening along a third dimension such that said peripheral device may extend in said third dimension.

2. The mobile computer system as claimed in claim 1 wherein said peripheral device may extend to any width along said first dimension after extending out from said expansion interface through said first opening in said second dimension or said second opening in said third dimension.

3. The mobile computer system as claimed in claim 1 wherein said second opening is open along a substantial majority of said peripheral device.

4. The mobile computer system as claimed in claim 1 wherein said peripheral device comprises a battery.

5. The mobile computer system as claimed in claim 4 wherein said battery is replaceable while said peripheral device is in said expansion interface.

6. The mobile computer system as claimed in claim 1 wherein said electrical interface comprises a PC-Card physical connector pin interface.

7. The mobile computer system as claimed in claim 6 wherein said expansion interface is keyed not to accept standard PC-Card devices.

8. The mobile computer system as claimed in claim 1 wherein said first opening is on a top of said mobile computer system.

9. The mobile computer system as claimed in claim 1 wherein said second opening is on a back of said mobile computer system.

10. The mobile computer system as claimed in claim 1 wherein said expansion interface includes at least one recessed shelf, said recessed shelf allowing a head of a screw in said expansion interface to be flush with a back surface of said expansion interface.

11. The mobile computer system as claimed in claim 10 wherein said recessed shelf is concealed by a tab on a peripheral device inserted into said expansion interface.

12. The mobile computer system as claimed in claim 11 wherein said tab includes a curved detent to accommodate said head of said screw.

13. The mobile computer system as claimed in claim 1 wherein said expansion interface includes at least one detent, said detent for allowing an expansion peripheral to securely hold itself in said expansion interface.

14. The mobile computer system as claimed in claim 13 wherein said detent is formed along a side wall of said expansion interface.

15. The mobile computer system as claimed in claim 1 further comprising:
   an external interface port; and
   a separate cradle, said cradle for holding said mobile computer system and interfacing with said external interface port.

16. The mobile computer system as claimed in claim 15 wherein said cradle comprises a retention pin, said retention pin engaging a hole on a back of said mobile computer system when said mobile computer system is placed in said cradle.

17. The mobile computer system as claimed in claim 16 wherein said cradle further comprises a flexible resistance mechanism.

18. The mobile computer system as claimed in claim 17 wherein said flexible resistance mechanism comprises electrical contacts on said cradle.

19. The mobile computer system as claimed in claim 15 wherein said cradle comprises at least one alignment pin, said alignment pin engaging a hole proximate to said external interface port on said computer system when said computer system is placed in said cradle.

20. A mobile computer system, said mobile computer system comprising:
   a mobile computer, said mobile computer comprising an external interface port having an electrical connector, said mobile computer having a first hole on a back surface of said mobile computer system;
   a cradle, said cradle for holding said mobile computer and interfacing with said external interface port, said cradle comprising
      a flexible resistance mechanism, said flexible resistance mechanism for pushing said mobile computer system away from said cradle, and
      a stationary retention pin, said stationary retention pin for engaging said first hole on said back surface of said mobile computer when said mobile computer is placed in said cradle and pushed down against said flexible resistance mechanism such that said mobile computer is firmly held within said cradle.

21. The mobile computer system as claimed in claim 20 wherein said flexible resistance mechanism comprises electrical contacts on said cradle for interfacing with said external interface port on said computer system.

22. The mobile computer system as claimed in claim 20 wherein said cradle comprises at least one alignment pin, said alignment pin engaging a second hole in said mobile computer proximate to said external interface port when said mobile computer is placed in said cradle.

23. A mobile computer system, said mobile computer system comprising:
- a mobile computer, said mobile computer comprising
  - an expansion interface, said expansion interface for accepting an expansion peripheral device, said expansion interface comprising a first electrical connector;
- an external interface port, said external interface port comprising a second electrical connector;
- a peripheral charge connector line that couples said first electrical connector on said expansion interface to said second electrical connector on said external interface port; and
- a cradle, said cradle for holding said mobile computer and interfacing with said external interface port with a cradle interface, said cradle interface supplying power to said peripheral charge connector line.

24. The mobile computer system as claimed in claim 23 wherein said cradle further comprises a retention pin and said mobile computer further comprises a detent that engages said retention pin.

25. The mobile computer system as claimed in claim 23 wherein said cradle further comprises a flexible resistance mechanism.

26. The mobile computer system as claimed in claim 25 wherein said flexible resistance mechanism comprises electrical contacts on said cradle interface.

27. The mobile computer system as claimed in claim 23 wherein said expansion peripheral device comprises a battery.

28. The mobile computer system as claimed in claim 27 wherein said battery is charged by said peripheral charge connector line.

29. The mobile computer system as claimed in claim 23 wherein said cradle comprises at least one alignment pin, said alignment pin engaging a hole in said mobile computer proximate to said external interface port when said mobile computer is placed in said cradle.

30. The mobile computer system as claimed in claim 29 further comprising:
- a protective cover, said protective cover engaging said alignment pin.

31. The mobile computer system as claimed in claim 30 wherein said protective cover may be placed on a back of said mobile computer system or on a front of said mobile computer system.

* * * * *